United States Patent
Lin et al.

(10) Patent No.: US 7,952,642 B2
(45) Date of Patent: May 31, 2011

(54) DISPLAY SYSTEM ADAPTABLE TO CHANGES IN VIDEO SIGNALS AND METHOD THEREOF

(75) Inventors: Chun-Lin Lin, Hsinchu (TW); Wei-Hao Syu, Taipei (TW)

(73) Assignee: Arcadyan Technology Corporation, Hsinchu (TW)

( * ) Notice: Subject to any disclaimer, the term of this patent is extended or adjusted under 35 U.S.C. 154(b) by 1323 days.

(21) Appl. No.: 11/504,718

(22) Filed: Aug. 16, 2006

(65) Prior Publication Data
US 2007/0040941 A1    Feb. 22, 2007

(30) Foreign Application Priority Data
Aug. 19, 2005 (TW) ................................ 94128529 A (51) Int. Cl.
*H04N 7/01* (2006.01)
*H04N 5/46* (2006.01)

(52) U.S. Cl. ..................... 348/445; 348/556; 348/558

(58) Field of Classification Search ............. 348/441, 348/445, 458, 459, 913, 555, 556, 558; *H04N 7/01, H04N 11/20, 5/46*
See application file for complete search history.

(56) References Cited

U.S. PATENT DOCUMENTS

| | | | | |
|---|---|---|---|---|
| 5,223,936 | A * | 6/1993 | Van Der Voort et al. | 348/445 |
| 7,187,415 | B2 * | 3/2007 | Arora | 348/445 |
| 2002/0180887 | A1 * | 12/2002 | Kim et al. | 348/556 |

* cited by examiner

*Primary Examiner* — Sherrie Hsia
(74) *Attorney, Agent, or Firm* — Birch, Stewart, Kolasch & Birch, LLP (57) ABSTRACT

A display system adaptable to changes in video signals and a method thereof display a video signal, which has a first display aspect ratio, in a display system, which has a second display aspect ratio. The display system includes a receiving unit for receiving the video signal, a detecting unit for detecting the first display aspect ratio of the video signal and a comparing unit for comparing the first display aspect ratio with the second display aspect ratio according to the first display aspect ratio detected by the detecting unit, and determining whether at least one covering structure is enabled in the display system so as to show the video signal corresponding to the display system.

15 Claims, 7 Drawing Sheets

DISPLAY SYSTEM ADAPTABLE TO CHANGES IN VIDEO SIGNALS AND METHOD THEREOF

BACKGROUND OF THE INVENTION

1. Field of Invention

The invention relates to a display system and a display method and, in particular, to a display system, which is adaptable to changes in video signals of a display region thereof according to display aspect ratios of input video signals, and a method thereof.

2. Related Art

Nowadays, various new display systems have been configured to have a wide screen with the aspect ratio of 16:9 so as to show the typical effect of a movie screen. The aspect ratio of 16:9 is the golden ratio which can meet the human visual system, such that the best wide field and the better visual effect can be obtained.

In a typical main medium of "television" for home entertainment, a so-called wide television is produced. However, many current video signals, such as an analog television signal, a standard definition (SD) digital television signal, and the like, still pertain to the conventional screen with the aspect ratio of 4:3, which is different from that of the present wide television. Thus, the wide television adopts two methods to solve the problem.

Figure 1A:
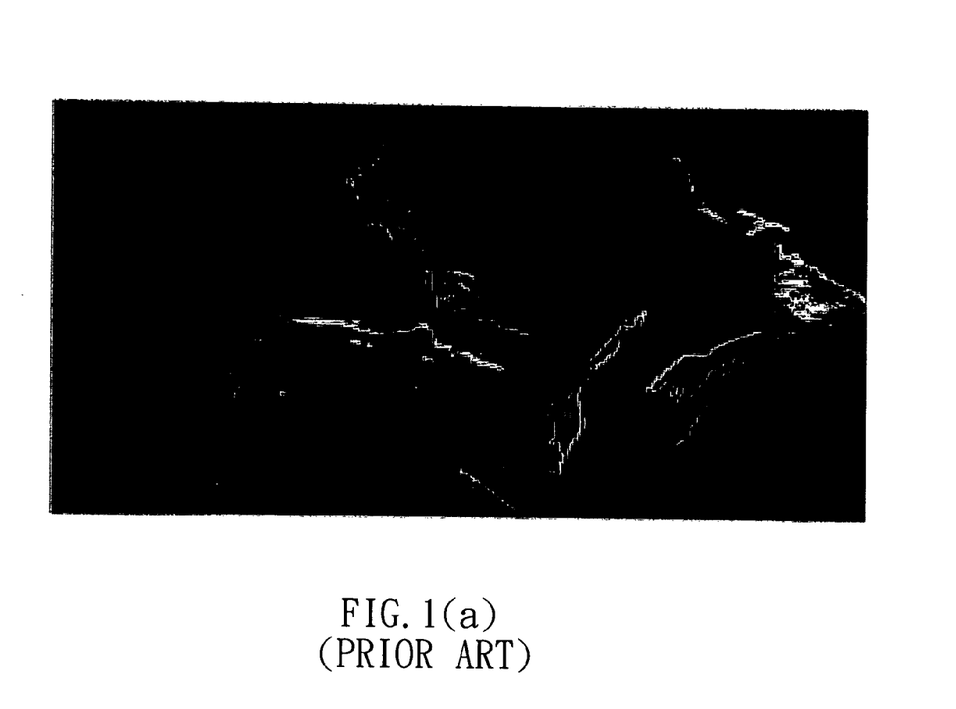
FIG. 1(a) shows a screen displayed by a conventional wide television, which receives a conventional video signal with the aspect ration of 4:3 in a pan and scan mode.

The first method is referred to as a pan and scan (full screen) mode, in which the display aspect ratio (4:3) of the video signal is changed, such that the wide televisions may be fully filled with the video screen. However, this method obviously distorts and deforms the display screen, as shown in FIG. 1(a).

Figure 1B:
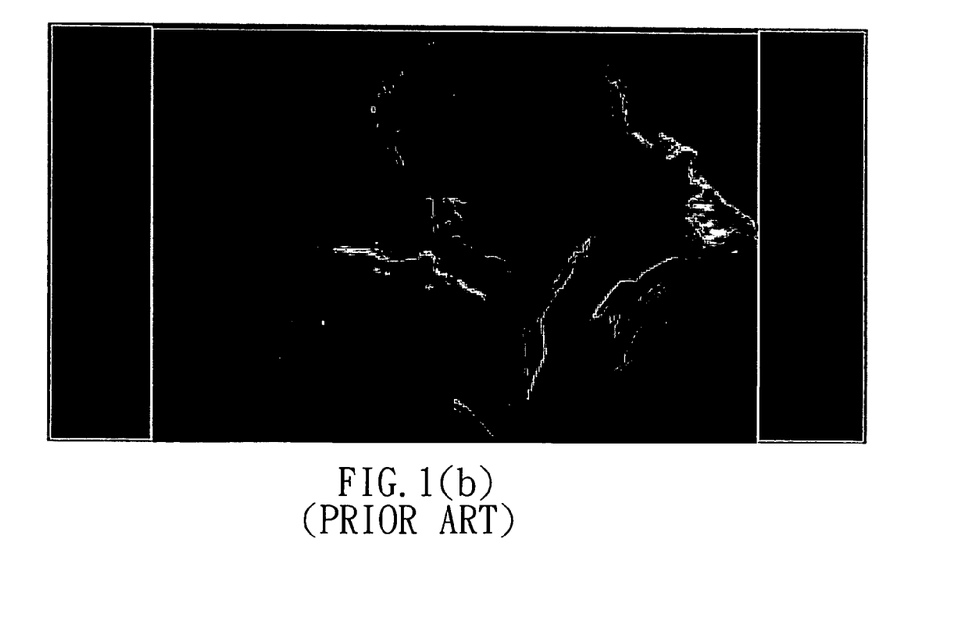
FIG. 1(b) shows a screen displayed by a conventional wide television, which receives a conventional video signal with the aspect ration of 4:3 in a letter box mode.

The second method is referred to as a letter box mode, in which the display aspect ratio (4:3) of the video signal is kept and two blank portions at two sides of the wide television are filled with black levels. However, this method produces two obvious black sides at the left and right sides of the screen, as shown in FIG. 1(b).

The visual effects of the deformed screen in the pan and scan mode or of the two black sides in the letter box mode cannot satisfy most users when they are watching the screen of the original video signal with the aspect ratio of 4:3. Due to the popularization of the wide television but the video signal having the aspect ratio of 4:3 is still the mainstream, more and more users will encounter such a problem. Thus, it is very important to provide the technology for solving the problem of uncomfortable visual feeling.

Therefore, it is an important subject of the invention to provide a display system adaptable to changes in video signals and a method thereof because the current display system still has the drawback in displaying the video signals with different aspect ratios.

SUMMARY OF THE INVENTION

In view of the foregoing, the invention is to provide a display system adaptable to changes in video signals and a method thereof, which enable the user to watch an analog video signal or standard definition video signal without black sides and deformation on a wide television. The visual effect of eliminating the black side measurement can be achieved and the display aspect ratio of video signal can be kept.

Furthermore, the invention is to provide a display system adaptable to changes in video signals and a method thereof. The invention can automatically detect various input video signals or perform a black side detecting step to determine whether or not a part of a display screen has to be covered when the wide television is on. Thus, the display system may be adjusted such that it is more human-oriented and the user may feel more comfortable in watching the program.

To achieve the above, the invention discloses a display system with a second display aspect ratio and for displaying a video signal with a first display aspect ratio. The display system includes a receiving unit, a detecting unit, at least one covering structure and a comparing unit. The receiving unit receives the video signal. The detecting unit detects the first display aspect ratio of the video signal. The comparing unit compares the first display aspect ratio with the second display aspect ratio according to the first display aspect ratio detected by the detecting unit, and determines whether the at least one covering structure is enabled in the display system so as to show the video signal corresponding to the display system.

In the above-mentioned aspect, the first display aspect ratio of the video signal is 16:9 or 4:3.

In the above-mentioned aspect, the second display aspect ratio of the display system is 16:9. Thus, when the detecting unit detects that the first display aspect ratio of the video signal is 4:3, the comparing unit enables the at least one covering structure to hide a part of the display system so that the display system shows the video signal with the aspect ratio of 4:3.

In the above-mentioned aspect, the covering structure is hidden inside a side plate of the display system.

In the above-mentioned aspect, the video signal is a digital video broadcast (DVB) video format, a national television system committee (NTSC) video format, or a video-in video format.

In the above-mentioned aspect, the NTSC video format has a display aspect ratio of 4:3.

In the above-mentioned aspect, the DVB video format includes a high definition (HD) resolution and a standard definition (SD) resolution. Herein, the HD resolution has a display aspect ratio of 16:9, and the SD resolution has a display aspect ratio of 4:3.

To achieve the above, the invention also discloses a display method of a display system, which has a second display aspect ratio. The method includes the steps of: (a) receiving a video signal with a first display aspect ratio; (b) detecting the first display aspect ratio of the video signal; (c) comparing the second display aspect ratio of the display system with the first display aspect ratio of the video signal; and (d) enabling at least one covering structure, when the first display aspect ratio is determined to be different from the second display aspect ratio, so as to show the video signal corresponding to the display system.

In the above-mentioned aspect, the step (b) includes a step (b1) of judging a display aspect ratio of the video signal.

In the above-mentioned aspect, the video signal is a digital video broadcast (DVB) video format, a national television system committee (NTSC) video format, or a video-in video format.

In the above-mentioned aspect, when the video signal is the DVB video format, the method further includes a step of analyzing whether the DVB video format is a high definition (HD) resolution or a standard definition (SD) resolution.

In the above-mentioned aspect, when the video signal is the NTSC video format, the method further includes a step of determining the display aspect ratio of the video signal is 4:3.

In the above-mentioned aspect, when the display aspect ratio of the video signal is determined to be a video-in video format, the method further includes a black side detecting step for determining whether black sides will be generated at two sides of the screen of the display system according to the first display aspect ratio of the video signal.

In the above-mentioned aspect, the black side detecting step compares brightness at two side regions of the screen with brightness at a middle region perpendicular to the two side regions to determine whether the black sides will be generated at the two sides of the screen of the display system.

In the above-mentioned aspect, the brightness at the two side regions is smaller than a first predetermined value, and the first predetermined value is equal to five times of a total number of pixels at the two side regions.

In the above-mentioned aspect, the brightness at the middle region is larger than a second predetermined value, and the second predetermined value is equal to 20 times of a total number of pixels at the middle region.

In the above-mentioned aspect, the video-in video format includes a composite video baseboard signal (CVBS), a separate video (V-Video) signal, and a color difference signal.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The display system adaptable to changes in video signals and the method thereof according to the preferred embodiments of the invention will be described with reference to the accompanying drawings. It is to be noted, however, that the actual architecture and method do not have to completely meet the described architecture and method. One of ordinary skill in the art may easily modify the architecture and method without departing from the spirit and scope of the invention.

Figure 2:
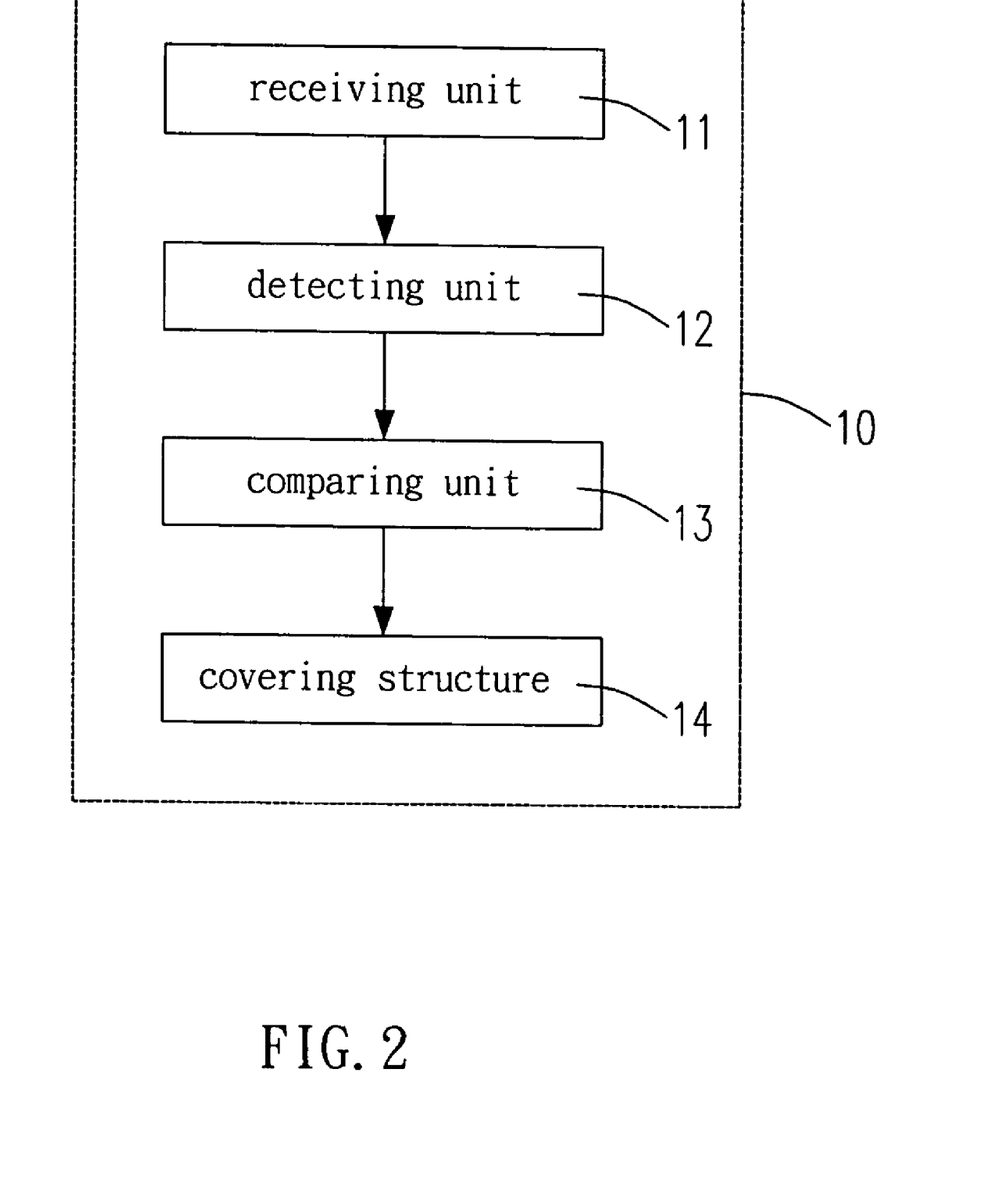
FIG. 2 is a schematic of a display system.

FIG. 2 is a schematic illustration showing a display system adaptable to changes in video signals according to a preferred embodiment of the invention. Referring to FIG. 2, a display system 10 includes a receiving unit 11, a detecting unit 12, a comparing unit 13 and at least one covering structure 14. The display system 10 may be utilized to display a video signal. The display aspect ratio of the video signal is a first display aspect ratio. The display aspect ratio of the display system 10 is a second display aspect ratio. The receiving unit 11 receives the video signal. The detecting unit 12 may detect the first display aspect ratio of the video signal. The comparing unit 13 compares the first display aspect ratio with the second display aspect ratio according to the first display aspect ratio detected by the detecting unit 12 so as to determine whether the covering structure 14 has to be enabled in the display system 10 to show the video signal corresponding to the display system.

The first display aspect ratio (DAR) of the video signal may be 16:9 or 4:3. The second display aspect ratio of the display system may also be 16:9.

Figure 3A:
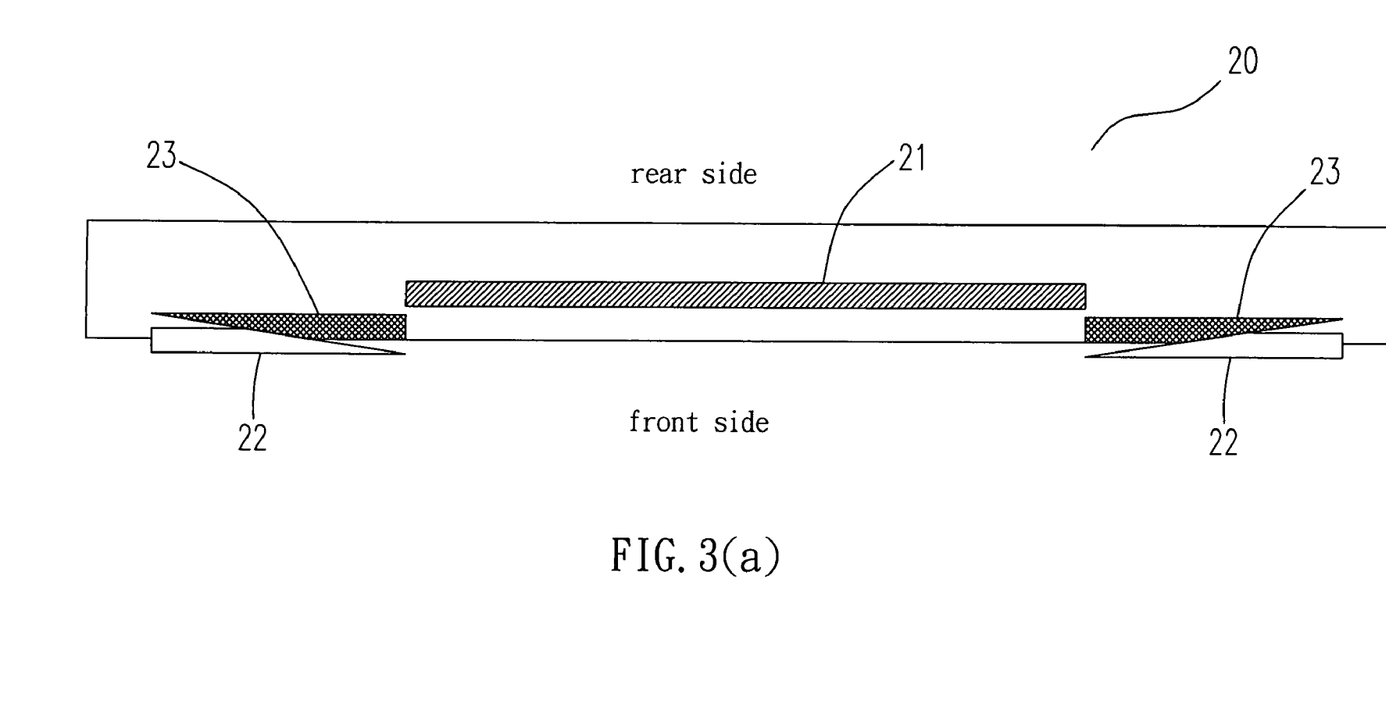
FIG. 3(a) is a top view showing a display system of the invention, wherein the covering structure is not enabled.

The details will be further discussed by way of example. As shown in FIG. 3(a), if the display system has a wide television 20 with the aspect ratio of 16:9, the wide television 20 has a display screen 21 with the aspect ratio of 16:9 and two side plates 22 disposed at left and right sides of the display screen 21. The display system of this invention further has two covering structures 23, which may be hidden inside the side plates 22.

According to the above-mentioned prior art, when the wide television 20 is displaying the video signal with the conventional aspect ratio of 4:3, two black sides are produced at two sides of the display screen 21, as shown in FIG. 1(b). In this invention, however, the detecting unit 12 and the comparing unit 13 of the display system can effectively analyze the first display aspect ratio of the received video signal to determine whether the first display aspect ratio is the same as the second display aspect ratio (i.e., the display aspect ratio of 16:9) of the wide television 20. If yes, the comparing unit 13 verifies that the first display aspect ratio of the received video signal and the second display aspect ratio of the wide television have the same display aspect ratio, and no further actions will be performed.

If the comparing unit 13 verifies that the received video signal and the wide television have different display aspect ratios, the comparing unit 13 enables the covering structures 23 to move inwards to hide parts of the display screen 21. Therefore, the viewable display screen 21 of the wide television 20 may match a screen size with the display aspect ratio of 4:3 but not the original display aspect ratio of 16:9.

Figure 3B:
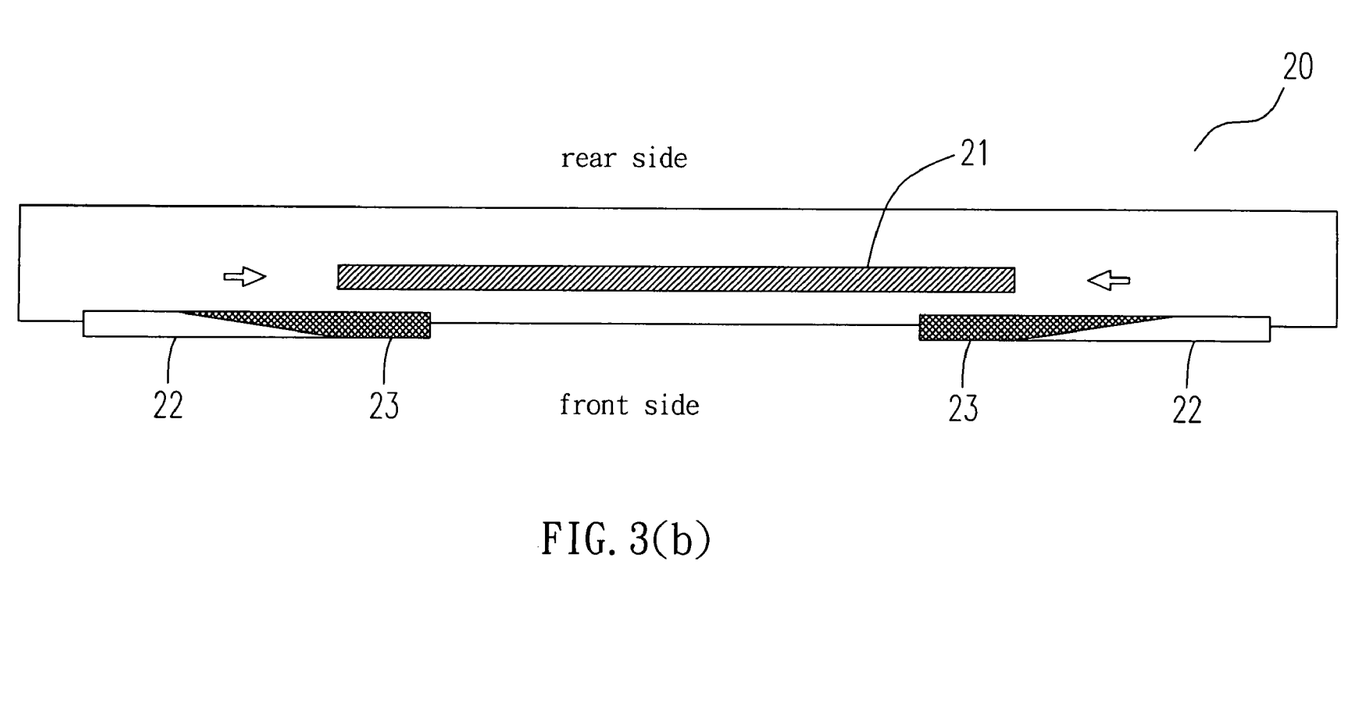
FIG. 3(b) is a top view showing the display system of the invention, wherein the covering structure is enabled to hide a part of the screen.

In order to prevent the outward movements of the covering structures 23 from obviously protruding into the wide television 20, this invention additionally designs each of the side plates 22 and the covering structures 23 into a trapezoid, as shown in FIG. 3(a). The opposite ends of the two trapezoids further have acute angles. Thus, when the covering structure 23 has to be moved out from the side plate 22 to cover the display screen 21, as shown in FIG. 3(b), the covering structure 23 may smoothly slide along the inclined acute angle of the side plate 22. Finally, the acute angles at the opposite ends of the side plate 22 and the covering structure 23 can contact each other to form a complete rectangular shape. Thus, the covering structure 23 can slide out smoothly without protruding out of the side plate 22, and such a design disables the obvious protruding structure when the wide television 20 immediately changes the size of the viewable display screen 21.

In addition, because the side plate 22 is originally a part of the existing outer frame apparatus (not shown) of the wide television 20, the structures of the side plates 22 at the left and right sides may be designed into trapezoids and the covering structures 23 corresponding to the trapezoids may be disposed inside without adding too much manufacturing cost and time.

In addition, the embodiment is discussed with respect to the display system, which has the second display aspect ratio of 16:9 and wants to display the video signal with the first display aspect ratio of 4:3. However, this invention may also be applied to the display system with the second display aspect ratio of 4:3, which is then used for displaying the video signal with the first display aspect ratio of 16:9, according to the same structural principle. In this case, the covering structures should be disposed inside the side plates at the top and bottom sides of the display system but not the left and right sides.

Figure 4:
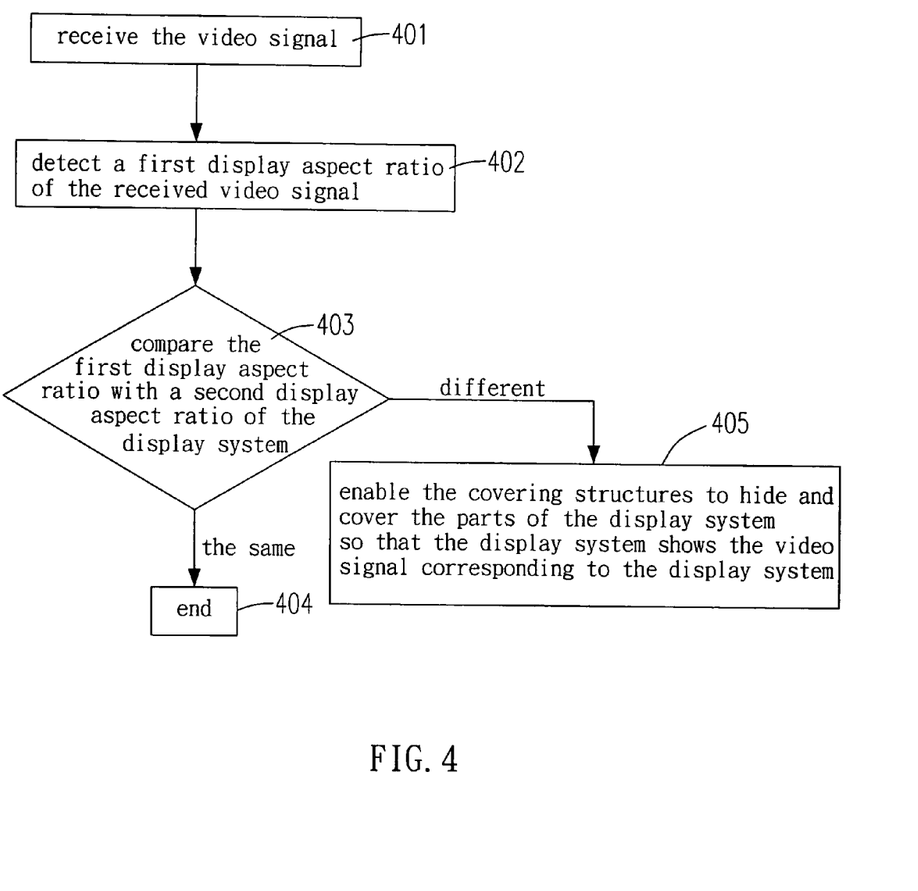
FIG. 4 is a flow chart showing a display method of the display system adaptable to changes in the video signals according to the preferred embodiment of the invention.

FIG. 4 is a flow chart showing a method of the display system adaptable to changes in the video signals according to the preferred embodiment of the invention. This method includes the following steps. In step 401, the display system receives the video signal with a first display aspect ratio. In step 402, the first display aspect ratio of the received video signal is detected. In step 403, the first display aspect ratio is compared with the second display aspect ratio of the display system. If the second display aspect ratio of the display system and the first display aspect ratio of the video signal are the same, no further process has to be performed, and the method ends in step 404. If the second display aspect ratio of the display system is different from the first display aspect ratio of the video signal, the covering structures are enabled to hide and cover the parts of the display system so that the display system shows the video signal corresponding to the display system, as shown in step 405. Thus, no black side or distorted image will be produced on the screen.

Figure 5:
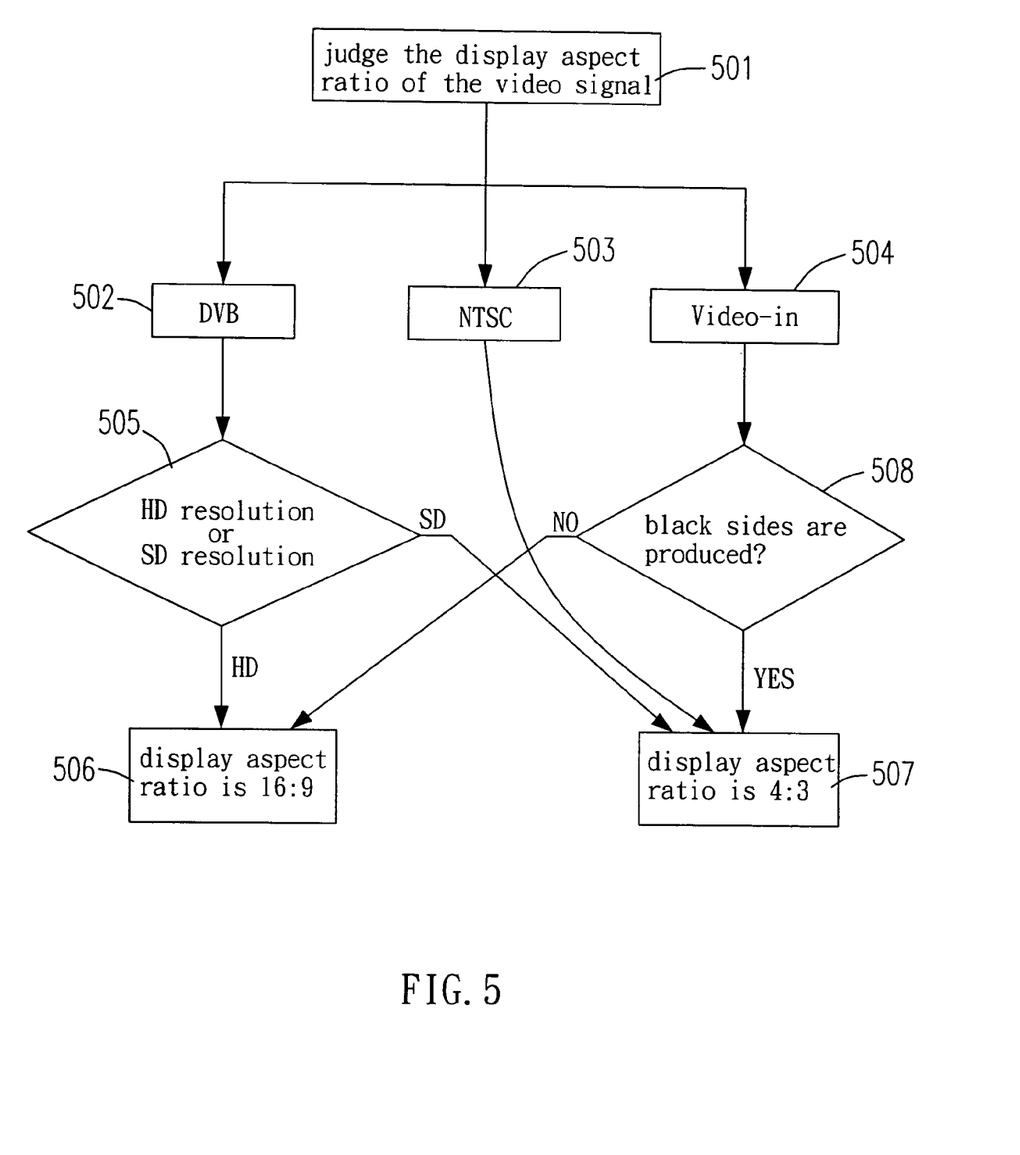
FIG. 5 is a flow chart showing implementation of a detection step of FIG. 4.

FIG. 5 is a flow chart showing implementation of the detection step 402 of FIG. 4. Because the typical video signal is often selected from one of the group consisting of a digital video broadcast (DVB) video format, a national television system committee (NTSC) video format and a video-in video format, three possible conditions may occur in a step 501 of judging a display aspect ratio of the video signal.

(1) When the video signal is identified as pertaining to the DVB video format, as shown in step 502, it is further analyzed whether the DVB video format pertains to a high definition (HD) resolution or a standard definition (SD) resolution, as shown in step 505. Because the HD resolution has the display aspect ratio of 16:9 and the SD resolution has the display aspect ratio of 4:3, it means that the video signal has the display aspect ratio of 16:9 in step 506 if the video signal is the HD resolution. On the contrary, it means that the video signal has the display aspect ratio of 4:3 in step 507 if the video signal is the SD resolution.

(2) When the video signal is identified as pertaining to the NTSC video format, as shown in step 503, the video signal is directly identified as having the display aspect ratio of 4:3 in step 507 because the NTSC video format pertains to the conventional analog signal.

(3) When the video signal is identified as pertaining to the video-in video format, as shown in step 504, it is difficult to directly determine whether the input video signal has the display aspect ratio of 16:9 or 4:3 because various signals, such as the CVBS (Composite Video Baseboard signal) signal, the S-Video (Separate Video) signal or the color difference signal, may have the video-in video format but come from different information sources. Thus, this invention additionally provides a black side detecting step 508 for directly determining whether the video signal having the video-in video format produces black sides at two sides on the screen of the display system.

Figure 6:
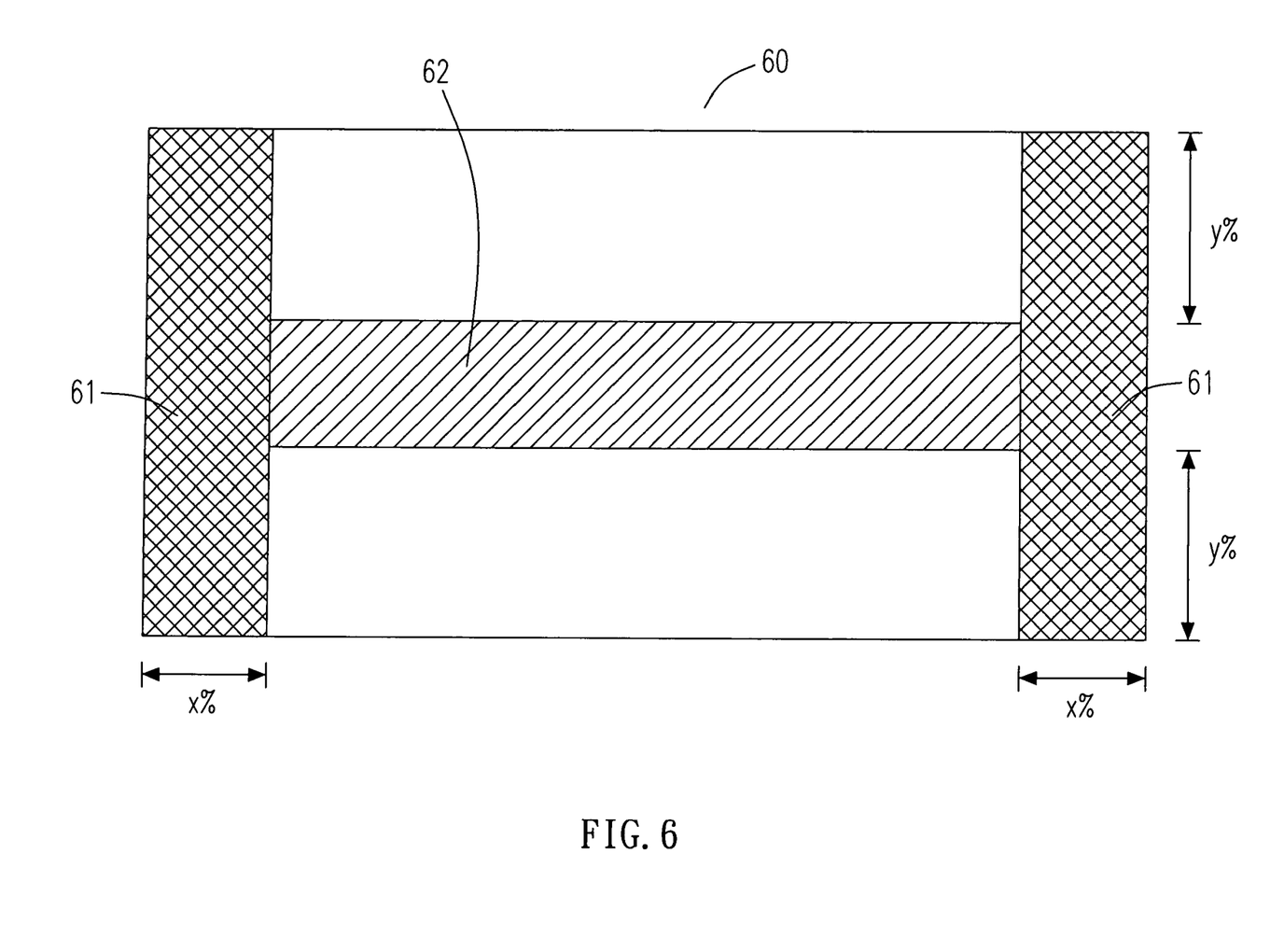
FIG. 6 shows a wide television using the technology of detecting the black sides according to the invention.

FIG. 6 shows a screen of a wide television using the technology of detecting the black sides according to another embodiment of the invention. This embodiment similarly utilizes a screen 60 with the display aspect ratio of 16:9. This detection technology includes two conditions. If the two conditions are established, it is possible to determine whether the received video signal has the display aspect ratio of 4:3 (i.e., the longitudinal black sides will be produced in two longitudinal side regions 61 at the left and right sides of the screen 60. The two conditions will be described in the following.

(A) Condition 1:

If the video signal has the display aspect ratio of 4:3, the longitudinal black sides will be produced at the left and right side regions 61 of the screen 60, and the widths of the black sides occupy a percentage of the width of the screen 60 with the display aspect ratio of 16:9, wherein the percentage is $$\left[16 - \frac{9}{3} \times 4\right] / 16 = 25\%.$$

Alternatively, it is possible to say that each of the black sides of the two side regions 61 occupies 12.5% of the width of the screen 60. Thus, this invention may set two rectangular regions (i.e., the two side regions 61) each having a width that is 12.5% of the width of the screen 60 ("x" in FIG. 6 is 12.5 but may be smaller). If the sum of the brightness values in the regions 61 is smaller than a default constant (i.e., the two side regions 61 are mostly black and only have a small number of bright spots of noises), the condition 1 can be satisfied. That is, $$\sum_{In\ two\ side\ regions} B < C1,$$

wherein B represents the brightness and constant C1 may be set as five times (brightness) of the total number of pixels in the two side regions 61. That is, C(brightness)=5(brightness)×number of pixels in two side regions.

(B) Condition 2:

If y=43.75 in FIG. 6 is set, the middle transversal rectangular region (hereinafter referred to as the middle region 62) between the two side regions 61 has the longitudinal width, which is just a percentage of the longitudinal width of the screen 60, wherein the percentage is (100−43.75×2)%=12.5%.

If the video signal is inputted, the middle region 62 may theoretically have a predetermined brightness value. Thus, this invention intends to summate the brightness values in the middle region 62 to get a sum, which should exceed a default constant C2. Therefore, if the sum of the brightness values in the middle region 62 is greater than a constant (i.e., most pixels in the region have predetermined values but are not totally black), the condition 2 is satisfied. That is, $$\sum_{In\ middle\ regions} B > C2,$$

wherein B represents brightness and constant C2 may be set as twenty times (brightness) of the total number of pixels in the middle region 62 (i.e., 20(brightness)×number of pixels in the middle region).

According to the above-mentioned description, if the above-mentioned two conditions have been established, it is determined that the received video signal has the display aspect ratio of 4:3 and two black sides appear. If the condition 1 is satisfied but the condition 2 is not satisfied, it can be concluded that no video signal is received or the darkest field is being displayed, and the detection has to be made later. In addition, if the condition 1 is not satisfied but the condition 2 is satisfied, it means that the received video signal has the display aspect ratio of 16:9.

The above-mentioned description is made according to the wide television having the display aspect ratio of 16:9. However, the black side detecting step of this invention may also be used in a conventional analog television having the display aspect ratio of 4:3 with a little difference. The difference is that the two side regions are transversal regions at top and bottom sides, and the middle region is the rectangular region interposed between the transversal regions.

Thus, various judging methods of the invention are utilized to determine the display aspect ratio of the inputted video signal, and the display aspect ratio is then compared with the actual display aspect ratio of the display system. Then, it is easy to know whether the display aspect ratio of the display system has to be changed, i.e., to determine whether the covering structure has to be enabled.

In practice, this invention is suitable for various display systems with different display aspect ratios. It is possible to determine whether various display aspect ratios of the video signals meet the existing display aspect ratios of the display system easily according to various determining mechanisms of the invention. When the display aspect ratio of the video signal and the display aspect ratio of the display system are different from each other, the covering structures are provided to fill the black sides produced due to different display aspect ratios. Thus, the screen of the display system looks like having the display aspect ratio as the display aspect ratio of the video signal.

In addition, this invention may further be configured to let the user control the covering structures in an active manner. In this case, the user may control the enabling and disabling states of the covering structures in a flexible and convenient way when the screen of the display system is covered by way of automatic detection.

Consequently, this invention enables the user to automatically detect various video signals when he or she is watching the television, or utilizes the black side detecting step to determine whether a part of the display screen has to be covered or the display screen has not to be covered in order to make the television screen more concordant and the user may watch programs more comfortable.

In summary, this invention can indeed provide a display system adaptable to changes in video signals and a method thereof, break the old thought that the existing video display mode can only follow the existing display aspect ratio of the display system, and control the display system simply according to the software/hardware control. Thus, the display system only has to be equipped with the covering structure, which is enabled/disabled to change the display aspect ratio of the display system according to the detection of the inputted video signal and the determining mechanism. The step of enabling the covering structure may also be determined by the user. Thus, this invention does not need many complicated hardware apparatuses and has a low cost in implementation. The technology of the display system and method thereof is simple and can provide the high convenience to make the user feel comfortable in visual feeling. Also, this invention can effectively progress the industry in a simple manner, and can be widely used in the industry.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display system with a second display aspect ratio and for displaying a video signal with a first display aspect ratio, the display system comprising:
   a receiving unit for receiving the video signal;
   a detecting unit for detecting the first display aspect ratio of the video signal;
   at least one covering structure; and
   a comparing unit for comparing the first display aspect ratio with the second display aspect ratio according to the first display aspect ratio detected by the detecting unit, and determining whether the at least one covering structure is enabled in the display system so as to show the video signal corresponding to the display system,
   wherein the video signal is selected from one of the group consisting of a digital video broadcast (DVB) video format, a national television system committee (NTSC) video format, and a video-in video format,
   wherein when the first display aspect ratio of the video signal is determined to be a video-in video format, the detecting unit determines whether black sides will be generated at two sides of the screen of the display system according to the first display aspect ratio of the video signal,
   wherein the detecting unit compares brightness at two side regions of the screen with brightness at a middle region perpendicular to the two side regions to determine whether the black sides will be generated at the two sides of the screen of the display system,
   wherein the brightness at the two side regions is smaller than a first predetermined value,
   wherein the first predetermined value is equal to five times of a total number of pixels at the two side regions.

2. The display system according to claim 1, wherein the first display aspect ratio of the video signal is 16:9 or 4:3.

3. The display system according to claim 1, wherein the second display aspect ratio of the display system is 16:9.

4. The display system according to claim 1, wherein when the detecting unit detects that the first display aspect ratio of the video signal is 4:3, the comparing unit enables the at least one covering structure to hide a part of the display system so that the display system shows the video signal with the aspect ratio of 4:3.

5. The display system according to claim 1, wherein the at least one covering structure is hidden inside a side plate of the display system.

6. The display system according to claim 1, wherein the DVB video format comprises a high definition (HD) resolution and a standard definition (SD) resolution.

7. The display system according to claim 6, wherein the HD resolution has a display aspect ratio of 16:9.

8. The display system according to claim 6, wherein the SD resolution has a display aspect ratio of 4:3.

9. A display method of a display system, the display system having a second display aspect ratio, the method comprising the steps of:
   (a) receiving a video signal with a first display aspect ratio;
   (b) detecting the first display aspect ratio of the video signal;
   (c) comparing a second display aspect ratio of the display system with the first display aspect ratio of the video signal; and (d) enabling at least one covering structure, when the first display aspect ratio is determined to be different from the second display aspect ratio, so as to show the video signal corresponding to the display system, wherein the video signal is selected from one of the group consisting of a digital video broadcast (DVB) video format, a national television system committee (NTSC) video format, and a video-in video format, wherein when the first display aspect ratio of the video signal is determined to be a video-in video format, the method further comprises a black side detecting step for determining whether black sides will be generated at two sides of the screen of the display system according to the first display aspect ratio of the video signal, wherein the black side detecting step compares brightness at two side regions of the screen with brightness at a middle region perpendicular to the two side regions to determine whether the black sides will be generated at the two sides of the screen of the display system, wherein the brightness at the two side regions is smaller than a first predetermined value, wherein the first predetermined value is equal to five times of a total number of pixels at the two side regions.

10. The method according to claim 9, wherein the step (b) further comprises a step (b1) of judging a display aspect ratio of the video signal.

11. The method according to claim 9, wherein when the video signal is the DVB video format, the method further comprises a step of analyzing whether the DVB video format is a high definition (HD) resolution or a standard definition (SD) resolution.

12. The method according to claim 11, wherein the HD resolution has a display aspect ratio of 16:9, and the SD resolution has a display aspect ratio of 4:3.

13. The method according to claim 9, wherein the brightness at the middle region is larger than a second predetermined value.

14. The method according to claim 13, wherein the second predetermined value is equal to 20 times of a total number of pixels at the middle region.

15. A display method of a display system, the display system having a second display aspect ratio, the method comprising the steps of:

(a) receiving a video signal with a first display aspect ratio;
(b) detecting the first display aspect ratio of the video signal;
(c) comparing a second display aspect ratio of the display system with the first display aspect ratio of the video signal; and
(d) enabling at least one covering structure, when the first display aspect ratio is determined to be different from the second display aspect ratio, so as to show the video signal corresponding to the display system, wherein the video signal is selected from one of the group consisting of a digital video broadcast (DVB) video format, a national television system committee (NTSC) video format, and a video-in video format, wherein when the first display aspect ratio of the video signal is determined to be a video-in video format, the method further comprises a black side detecting step for determining whether black sides will be generated at two sides of the screen of the display system according to the first display aspect ratio of the video signal, wherein the black side detecting step compares brightness at two side regions of the screen with brightness at a middle region perpendicular to the two side regions to determine whether the black sides will be generated at the two sides of the screen of the display system, wherein the brightness at the middle region is larger than a second predetermined value, wherein the second predetermined value is equal to 20 times of a total number of pixels at the middle region.

* * * * *